United States Patent

[11] 3,604,253

| [72] | Inventors | Leonard A. Kersch;<br>James Seydel, both of Ann Arbor, Mich. |
|---|---|---|
| [21] | Appl. No. | 751,089 |
| [22] | Filed | Aug. 8, 1968 |
| [45] | Patented | Sept. 14, 1971 |
| [73] | Assignee | GCOptronics, Inc.<br>Ann Arbor, Mich. |

[54] METHOD OF VIBRATION ANALYSIS EMPLOYING COHERENT LIGHT
7 Claims, 5 Drawing Figs.

[52] U.S. Cl. ............................................. 73/67.2, 73/71.3
[51] Int. Cl. ................................................... G01h 9/00
[50] Field of Search ........................................... 73/67, 67.2, 69, 70, 71.1, 71.3, 432, 67.5, 67.6; 116/114; 356/106; 350/163

[56] References Cited
UNITED STATES PATENTS

| 2,782,632 | 2/1957 | Klein et al. ...................... | 73/67.2 |
| 3,373,401 | 3/1968 | Bayer ............................ | 340/17 |
| 3,444,316 | 5/1969 | Gerritsen ........................ | 73/67.5 UX |

OTHER REFERENCES
Cutler, C. C., Coherent Light International Science and Technology, Sept. 1963, pp. 54–63.

Primary Examiner—Richard C. Queisser
Assistant Examiner—John P. Beauchamp
Attorney—Hauke, Krass, Gifford and Patalidis ABSTRACT: To detect physical anomalies in a member such as cracks or subsurface defects, a surface of the member is illuminated with light derived from a laser and vibration is induced in the member. The member will appear to have a speckled or mottled appearance in areas which are not in motion because of the interference at the eye between light reflected from various points on the member. When the member is in motion the speckled pattern disappears and the object appears as if normally illuminated. By varying the frequency and intensity of vibratory motion imparted to the member local regions of the member which contain a defect or flaw are caused to vibrate independently of the balance of the member and these flaws are detected by observing modifications in the mottled pattern.

PATENTED SEP 14 1971
3,604,253
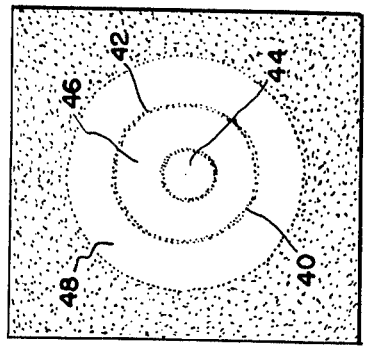
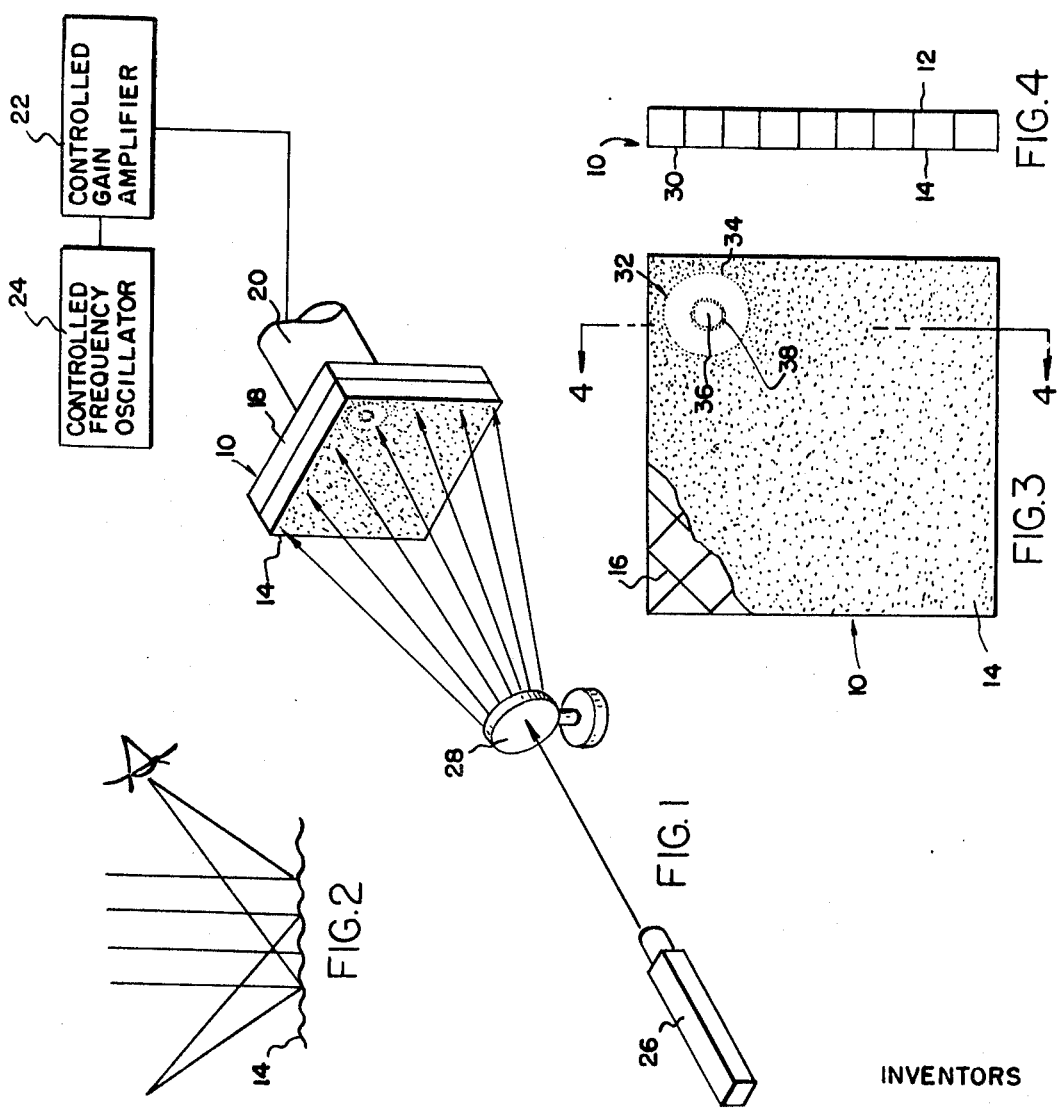
INVENTORS
LEONARD KERSCH
JAMES SEYDEL
BY Hauke, Krass, Gifford, & Patalidi
ATTORNEYS

METHOD OF VIBRATION ANALYSIS EMPLOYING COHERENT LIGHT

BACKGROUND OF THE INVENTION

1. Field of the Invention

This invention relates to a non destructive testing method for detecting anomalies in a member such as cracks, disbonds, and sub surface defects employing coherent light.

2. Prior Art

It has long been known that light exhibits many wavelike properties including the occurrence of interference effects. These effects were produced in laboratories under carefully controlled circumstances but were generally not observed elsewhere because of the low coherence of general illumination sources. Such incoherent sources effectively act as a plurality of independent sources providing illumination at random relationships with respect to one another. Therefore the intensity of light at any point on an illuminated object is effectively the random vector sum of a large number of incident waves, masking any interference effects which might occur at the object or at the eye viewing the object based upon the interference of reflected waves.

Until the recent development of the laser, sources of light having a high degree of coherence were not even available in a laboratory environment. While the output of a laser is not perfectly coherent it is so much more coherent than prior available light that it exhibits many interference phenomena which were heretofore undetected. One of the most common of these effects is noted whenever a surface which is not extremely smooth is illuminated by light from a laser. An observer views the surface as having a mottled or speckled appearance. This has been attributed to interference at the eye of the observer between plural light beams reflected from the surface in such a way as to arrive at the same point at the eye along paths of different lengths. When an extremely smooth surface such as a film is illuminated by a laser, the light is reflected from the surface in parallel beams so that no interference between the light rays occurs.

This phenomenon is discussed in some detail in an article by C. Chapin Cutler in International Science and Technology for Sept. 1963 at page 54.

The speckled effect on a surface illuminated by a laser presents a different appearance to each viewer and of course is modified as the point of viewing changes. Another characteristic of this phenomenon is that the pattern disappears when rapid motion of the viewer with respect to the object occurs. This is attributable to the retentivity of the eye averaging the resultant light fluctuation to provide the appearance of a smooth image. This motion need not be through any appreciable distance since motion of even microscopic proportions will produce appreciable modifications in the point at which a light beam reflected from a point on the surface reaches the eye.

SUMMARY OF THE PRESENT INVENTION

Our invention couples this phenomenon with recognition that anomalous areas in a solid member can often be caused to vibrate in a mode which differs from that of the balance of the member by inducing energy of an appropriate frequency and amplitude in the member, in order to provide a method which is primarily useful to determine the presence of undesirable anomalies in members. The method broadly comprised the technique of inducing vibrations of particular frequencies and amplitudes in members while they are illuminated with coherent light and observing modifications which occur in the mottling pattern. More particularly, the technique involves the induction of a vibration producing force which is scanned in frequency and/or intensity in order that the observer may detect vibratory anomalies which occur at any of the frequencies and/or amplitudes within the scanning range.

A particular anomaly may in certain cases be caused to vibrate while the balance of the members are substantially stationary, or in other cases, may remain stationary while the balance of the member is caused to vibrate. The response of a given anomalie in a particular member to the induced vibratory energy is usually only determinable on an empirical basis.

The present method may also be used in certain cases to determine the mode of vibration of a member which is normally subjected to vibration, such as a transducer head or an engine block. In such situations the method reduces to simply illuminating the member with light from a laser and observing it while the force that induces the vibration is imposed upon the member and varied through its complete range.

The method of the present invention provides qualitative rather than quantitative information about the response of an object to the induced vibratory motion. That is, it indicates that certain regions of an object in which energy is being induced are in motion and allows the patterns or modes of vibration to be observed, but does not directly provide any information as to the amplitude of the motion. In certain cases, the fact of motion, or lack of motion itself will reveal the existence and location of a flaw in a body under study. For example, in certain metal honeycomb structures a surface skin is intended to be bonded to normally extending sheets arranged in a honeycomb array. The method of the present invention may be used to detect a failure of bond at any point between the cover skin and the honeycomb because the vibratory pattern of the section at the disbond will be different from that of the balance of the body and at certain amplitudes and frequencies of induced vibration the disbonded section may be caused to vibrate while the balance of the structure is not in motion.

In other situations, the method of the present invention may not provide the final information sought but only preliminary information which is useful in guiding a more intensive vibration examination technique such as that provided by holographic interferometry.

Other objects, advantages and applications of the present invention will be made apparent be the following detailed descriptions of two embodiments of the invention. The descriptions make reference to the accompanying drawings in which:

FIG. 1 is a perspective view of apparatus for practicing the method of the present invention to detect debonded areas in a honeycomb structure;

FIG. 2 is a schematic diagram illustrating the manner in which light is reflected from a specimen tested with the apparatus of FIG. 1;

FIG. 3 is a view of the front of a section of honeycomb metal under test with a section of the front skin broken away to show the interior;

FIG. 4 is a section through the honeycomb of FIG. 3 taken along line 4—4 of FIG. 3; and FIG. 5 is an illustration of the mottling pattern which may be observed on the head of a sonic transducer.

Referring to the drawings, FIG. 1 illustrates apparatus for performing a preferred embodiment of the method of the present invention wherein a rectangle of honeycomb material, generally indicated at 10, is nondestructively tested for debonds. The honeycomb section is a rectangle formed with a pair of face sheets 12 and 14 joined together by strips 16 which extend normally between the faces 12 and 14 and are arranged in a honeycomb pattern as is best seen in the broken section of FIG. 3. The edges of the honeycomb core 16 are intended to be bonded to the face sheets 12 and 14 at all points along their lines of contact.

In order to test this bond, the honeycomb section 10 is supported with one of its walls 12 in abutment with the face of a vibratory transducer head 18. The honeycomb section 10 may be joined to the face of the transducer 18 by an appropriate method that is dependent upon its exact form. If tests were to be made on a production basis an appropriate fixture would be used to join test specimen to the transducer head.

The transducer is powered by a magnetic coil 20 which receives current from a controlled gain amplifier 22. The amplifier input is from a controlled frequency oscillator 24. Appropriate manual inputs are employed to adjust the frequency of the oscillator and the gain of the amplifier 20 to adjust the amplitude and frequency of the vibrations provided by the head 18. In other embodiments of the invention, different forms of transducers, such as piezoelectric, may be employed to provide any desirable frequencies, including the ultrasonic.

The outer surface of the honeycomb top skin 14 is illuminated with coherent light derived from the output beam of a laser 26 as spread by a suitable lens 28. In the absence of any excitation of the coil 20 an observer maintaining his eye relatively steady with respect to the honeycomb skin 14 will view the honeycomb surface 14 as having a speckled or mottled appearance. This is due to the mechanism illustrated in FIG. 2 wherein the diffraction of incident light from a surface of the skin layer 14 is diagrammatically illustrated.

The roughness of the surface at the microscopic level causes the substantially parallel incident light beams to be reflected from the surface at various angles. Accordingly, the light reaching any point on the viewer's eye at a given instant will be the vector sum of light reflected form one or more points on the surface 14. Since the light beams are coherent with respect to one another they will additively and subtractively interfere at the surface of the eye to produce a pattern of dark and light spots which appears to continually change as a result of the inevitable small movements of the eye.

If the surface of the honeycomb skin 14 is uniformly vibrating as a result of the energy induced into the section 10 by the transducer head 18, the mottled or speckled pattern will disappear because the rapid constantly changing relationship of the viewer's eye with respect to the top plate will effectively cause the instantaneously observed variations to average out and give the appearance of a uniformly illuminated surface. On the other hand, if parts of the top plate are in motion and other parts are stationary, the speckled or mottled pattern will provide a readily observable indication of the vibration pattern even though the vibratory motion is of such a small amplitude as to be itself visually undetectable.

FIG. 3 illustrates a mottled pattern which might appear on the surface of a honeycomb if a disbond is present between the surface skin and one of the internal sections, as at 30. As a result of this disbond one section of the top plate 14 will be supported differently than the balance of the surface, and accordingly, will respond to the induced vibrations in a different manner. With an appropriate amplitude and frequency of vibrating energy the section of the skin 14 adjacent to the disbond 30 can be caused to vibrate while the balance of the surface is stationary. The resultant mottled pattern is illustrated by the area generally indicated at 32 in the upper right-hand corner of the face as seen on FIG. 3. The mottled pattern extends over substantially all of the face, with the exception of an annular section 34 centered on the disbond area 30 and a circular section 36 disposed centrally within the annulus 34. The particular mode of vibration produces a small stationary speckled ring 38 between the annular section 34 and the circle 36.

In order to detect this disbond the frequency and amplitude of the vibration may be adjusted by manual control of units 24 and 22 to either produce a fixed form of vibration which has been emperically shown to induce separate vibration patterns at small observing areas, or by scanning the frequency and amplitude and continually observing the mottle pattern to determine a particular frequency and amplitude which may excite a debonded area separately from the balance of the surface.

FIG. 5 illustrates a mottling pattern which may occur on either a test specimen or a normally vibrated member such as a transducer face, which reveals the mode of vibration of the member rather than anomalies The pattern consists of a pair of concentric mottled rings 40 and 42 bounded by a clear center 44 and a pair of clear rings 46 and 48. The present method may be used to make adjustments on such transducers or test their proper operation.

It is to be understood that we have described our invention in its simplest terms and that various changes and revisions can be made therein without departing from the spirit of the invention as expressed in the scope of the appended claims.

Having thus described our invention, we claim:

1. The method of analyzing a member by detecting its vibrating and nonvibrating regions, comprising: causing the member to vibrate; illuminating the surface of the vibrating member with coherent light derived from a laser and passed through a lens before impinging on the surface of the member; and viewing the surface of the member while it is so illuminated.

2 The method of claim 1 where the member is caused to be vibrated by an electromechanical transducer.

3. The method of claim 2 wherein the member to be analyzed forms part of said transducer.

4. The method of claim 2 wherein the transducer is controllable as to the frequency of the vibration applied to the member.

5. The method of claim 2 wherein the transducer is controlled as to the amplitude of vibration applied to the member.

6. The method of claim 2 wherein the transducer is controlled as to both the frequency and amplitude of the vibration induced in the member.

7. The method of claim 2 wherein the mode of the vibration is scanned over a continuous range during the process.